US007874492B2

(12) United States Patent
Levy et al.

(10) Patent No.: US 7,874,492 B2
(45) Date of Patent: *Jan. 25, 2011

(54) METHOD AND SYSTEM FOR FACILITATING MEMORY AND APPLICATION MANAGEMENT ON A SECURED TOKEN

(75) Inventors: Philippe Levy, Belmont, CA (US); Ayman Hammad, Pleasanton, CA (US); Virginia Simcox, Hayward, CA (US); Jerry Sloan, Saratoga, CA (US); Mary Gorden, Greenwood, CA (US)

(73) Assignees: Visa U.S.A. Inc., San Francisco, CA (US); Visa International Service Association, Foster City, CA (US)

( * ) Notice: Subject to any disclaimer, the term of this patent is extended or adjusted under 35 U.S.C. 154(b) by 739 days.

This patent is subject to a terminal disclaimer.

(21) Appl. No.: 11/761,920

(22) Filed: Jun. 12, 2007

(65) Prior Publication Data
US 2007/0250925 A1  Oct. 25, 2007

Related U.S. Application Data

(63) Continuation of application No. 10/310,748, filed on Dec. 4, 2002, now Pat. No. 7,243,853.

(60) Provisional application No. 60/338,419, filed on Dec. 4, 2001.

(51) Int. Cl.
*G06K 19/06* (2006.01)
(52) U.S. Cl. ............... 235/492; 235/379; 235/380
(58) Field of Classification Search ................ 235/379, 235/380–382, 441, 487, 488, 492; 705/64–66, 705/41; 713/159, 172; 194/205; 361/373; 707/101
See application file for complete search history.

(56) References Cited

U.S. PATENT DOCUMENTS

| 3,798,605 | A | 3/1974 | Feistel |
| 4,405,829 | A | 9/1983 | Rivest et al. |
| 4,924,378 | A | 5/1990 | Hershey et al. |
| 4,985,615 | A | 1/1991 | Iijima |
| 5,048,085 | A | 9/1991 | Abraham et al. |
| 5,049,728 | A | 9/1991 | Rovin |

(Continued)

FOREIGN PATENT DOCUMENTS

AU  739906 B2  10/2001

(Continued)

*Primary Examiner*—Karl D. Frech
(74) *Attorney, Agent, or Firm*—Townsend and Townsend and Crew LLP

(57) ABSTRACT

A system for facilitating memory and application management on a smartcard the system includes a client having a number of applications and a smartcard having specification logic allowing file structures and security and access conditions to be defined using a set of common commands. Each application has a corresponding group of data on the smartcard. An applet instance is created for each application and corresponding group of application data. At the time of instantiation, the specification logic allows an application to specify the file structure and/or to specify security and access conditions for its group of data. An application can utilize passcode and credential management so that a single passcode is used to access the smartcard regardless of whether the application utilizes the common commands to specify a file structure.

23 Claims, 1 Drawing Sheet

U.S. PATENT DOCUMENTS

| | | | |
|---|---|---|---|
| 5,065,429 A | 11/1991 | Lang |
| 5,148,481 A | 9/1992 | Abraham et al. |
| 5,161,256 A | 11/1992 | Iijima |
| 5,191,611 A | 3/1993 | Lang |
| 5,204,961 A | 4/1993 | Barlow |
| 5,235,642 A | 8/1993 | Wobber et al. |
| 5,239,648 A | 8/1993 | Nukui |
| 5,241,599 A | 8/1993 | Bellovin et al. |
| 5,272,754 A | 12/1993 | Boerbert |
| 5,274,824 A | 12/1993 | Howarth |
| 5,285,200 A | 2/1994 | Kuriyama |
| 5,371,692 A | 12/1994 | Draeger et al. |
| 5,416,842 A | 5/1995 | Aziz |
| 5,418,854 A | 5/1995 | Kaufman et al. |
| 5,448,045 A | 9/1995 | Clark |
| 5,455,953 A | 10/1995 | Russell |
| 5,491,752 A | 2/1996 | Kaufman et al. |
| 5,495,533 A | 2/1996 | Linehan et al. |
| 5,502,766 A | 3/1996 | Boebert et al. |
| 5,504,701 A | 4/1996 | Takahashi et al. |
| 5,526,233 A | 6/1996 | Hayakawa |
| 5,544,246 A | 8/1996 | Mandelbaum et al. |
| 5,563,395 A | 10/1996 | Hoshino |
| 5,563,400 A | 10/1996 | Le Roux |
| 5,578,808 A | 11/1996 | Taylor |
| 5,590,199 A | 12/1996 | Krajewski, Jr. et al. |
| 5,602,918 A | 2/1997 | Chen et al. |
| 5,606,615 A | 2/1997 | Lapointe et al. |
| 5,613,012 A | 3/1997 | Hoffman et al. |
| 5,649,118 A | 7/1997 | Carlisle et al. |
| 5,657,388 A | 8/1997 | Weiss |
| 5,742,845 A | 4/1998 | Wagner |
| 5,757,920 A | 5/1998 | Misra et al. |
| 5,802,519 A | 9/1998 | De Jong |
| 5,805,719 A | 9/1998 | Pare, Jr. et al. |
| 5,815,657 A | 9/1998 | Williams et al. |
| 5,838,812 A | 11/1998 | Pare, Jr. et al. |
| 5,841,866 A | 11/1998 | Bruwer et al. |
| 5,887,063 A | 3/1999 | Varadharajan et al. |
| 5,892,902 A | 4/1999 | Clark |
| 5,897,616 A | 4/1999 | Kanevsky et al. |
| 5,898,838 A | 4/1999 | Wagner |
| 5,901,284 A | 5/1999 | Hamdy-Swink |
| 5,905,908 A | 5/1999 | Wagner |
| 5,917,168 A | 6/1999 | Nakamura et al. |
| 5,931,917 A | 8/1999 | Nguyen et al. |
| 5,974,504 A | 10/1999 | Lee et al. |
| 5,987,132 A | 11/1999 | Rowney |
| 5,991,411 A | 11/1999 | Kaufman et al. |
| 5,991,519 A | 11/1999 | Benhammou et al. |
| 5,996,076 A | 11/1999 | Rowney et al. |
| 6,011,976 A | 1/2000 | Michaels et al. |
| 6,016,476 A | 1/2000 | Maes et al. |
| 6,052,690 A | 4/2000 | de Jong |
| 6,055,314 A | 4/2000 | Spies et al. |
| 6,061,796 A | 5/2000 | Chen et al. |
| 6,073,238 A | 6/2000 | Drupsteen |
| 6,073,242 A | 6/2000 | Hardy et al. |
| 6,075,860 A | 6/2000 | Ketcham |
| 6,101,477 A | 8/2000 | Hohle et al. |
| 6,119,228 A | 9/2000 | Angelo et al. |
| 6,128,602 A | 10/2000 | Northington et al. |
| 6,147,744 A | 11/2000 | Smart et al. |
| 6,158,011 A | 12/2000 | Chen et al. |
| 6,185,681 B1 | 2/2001 | Zizzi |
| 6,189,096 B1 | 2/2001 | Haverty |
| 6,193,163 B1 | 2/2001 | Fehrman et al. |
| 6,199,762 B1 | 3/2001 | Hohle |
| 6,208,264 B1 | 3/2001 | Bradney et al. |
| 6,219,439 B1 | 4/2001 | Burger |
| 6,219,669 B1 | 4/2001 | Haff et al. |
| 6,220,510 B1 | 4/2001 | Everett et al. |
| 6,222,933 B1 | 4/2001 | Mittermayer et al. |
| 6,226,752 B1 | 5/2001 | Gupta et al. |
| 6,253,027 B1 | 6/2001 | Weber et al. |
| 6,279,112 B1 | 8/2001 | O'Toole, Jr. et al. |
| 6,282,656 B1 | 8/2001 | Wang |
| 6,296,191 B1 | 10/2001 | Hamann et al. |
| 6,304,658 B1 | 10/2001 | Kocher et al. |
| 6,308,317 B1 | 10/2001 | Wilkinson et al. |
| 6,385,729 B1 | 5/2002 | DiGiorgio et al. |
| 6,557,032 B1 | 4/2003 | Jones et al. |
| 6,629,591 B1 | 10/2003 | Griswold et al. |
| 6,779,718 B1 | 8/2004 | Wlodarczyk |
| 7,243,853 B1 * | 7/2007 | Levy et al. .................. 235/492 |
| 2002/0050528 A1 | 5/2002 | Everett et al. |

FOREIGN PATENT DOCUMENTS

| | | |
|---|---|---|
| AU | 744984 B2 | 7/2002 |
| CA | 2317138 A1 | 1/2002 |
| EP | 0442839 A2 | 8/1991 |
| EP | 0447339 A2 | 9/1991 |
| EP | 0566811 A1 | 10/1993 |
| EP | 0644513 A2 | 3/1995 |
| EP | 0666550 A1 | 9/1995 |
| EP | 0798673 A1 | 10/1997 |
| EP | 0831434 A1 | 3/1998 |
| EP | 0949593 A2 | 10/1999 |
| EP | 0949595 A2 | 10/1999 |
| EP | 0949595 A3 | 10/1999 |
| EP | 0984404 A2 | 3/2000 |
| EP | 0984404 A3 | 3/2000 |
| EP | 1039403 A2 | 9/2000 |
| EP | 1072024 A1 | 1/2001 |
| EP | 0932865 B1 | 8/2002 |
| GB | 2238636 A | 6/1991 |
| GB | 2281645 A | 3/1995 |
| GB | 2298505 A | 9/1996 |
| GB | 2333630 A | 7/1999 |
| WO | WO 94/30023 A1 | 12/1994 |
| WO | WO 96/05549 A1 | 2/1996 |
| WO | WO 97/37331 A1 | 10/1997 |
| WO | WO 98/19237 A1 | 5/1998 |
| WO | WO 98/37526 A1 | 8/1998 |
| WO | WO 98/52159 A2 | 11/1998 |
| WO | WO 98/52159 A3 | 11/1998 |
| WO | WO 99/18504 A1 | 4/1999 |
| WO | WO 99/38129 A1 | 7/1999 |
| WO | WO 99/39257 A1 | 8/1999 |
| WO | WO 99/49426 A1 | 9/1999 |
| WO | WO 99/52065 A1 | 10/1999 |
| WO | WO 99/57675 A1 | 11/1999 |
| WO | WO 00/34927 A1 | 6/2000 |
| WO | WO 00/51070 A1 | 8/2000 |
| WO | WO 00/67212 A1 | 11/2000 |
| WO | WO 00/68902 A1 | 11/2000 |
| WO | WO 00/69183 A2 | 11/2000 |
| WO | WO 01/08087 A1 | 2/2001 |
| WO | WO 01/18746 A1 | 3/2001 |
| WO | WO 01/42887 A2 | 6/2001 |
| WO | WO 01/42887 A3 | 6/2001 |
| WO | WO 02/10981 A1 | 2/2002 |
| WO | WO 02/15037 A1 | 2/2002 |
| WO | WO 02/21466 A2 | 3/2002 |

* cited by examiner

METHOD AND SYSTEM FOR FACILITATING MEMORY AND APPLICATION MANAGEMENT ON A SECURED TOKEN

CROSS-REFERENCES TO RELATED APPLICATION

The present application is a continuation of U.S. patent application Ser. No. 10/310,748 entitled "Method and System for Facilitating Memory and Application Management on a Secured Token" filed on Dec. 4, 2002, which claims the benefit of priority under 35 U.S.C. §119 from U.S. Provisional Patent Application Ser. No. 60/338,419 entitled "Smart Card Framework" filed on Dec. 4, 2001, each of which is hereby incorporated herein by reference in its entirety for all purposes.

BACKGROUND OF THE INVENTION

The present invention generally relates to smartcard, and more specifically, to a method and system for facilitating memory and application management of multiple applications on a smartcard.

With current technologies, a single smartcard is able to store and handle multiple applications. Typically, when a single smartcard contains multiple applications, each application is kept separate and operates independently of other applications. More specifically, the application code or logic and associated data for each application are strictly confined for access and use by that particular application. In other words, the application code and the associated data for each application are not shared with other applications on the smartcard.

In general, applications often include a number of functions or logic that is commonly used by almost all other applications residing on a smartcard. As a result, when applications do not share their code with other applications, there is an overlap of application code that is used for implementing these commonly used functions amongst the various applications. The duplicative application code did not present a significant disadvantage if memory space was freely available. In a smartcard, however, memory space is of a premium due to its limited physical size. Duplicative application code in a smartcard, therefore, occupies valuable memory space that could otherwise have been utilized for other purposes.

Hence, it would be desirable to provide a method and system that is capable of facilitating memory management of multiple applications on a smartcard.

Furthermore, when applications on a smartcard operate independently from one another, a person managing the smartcard must then be familiar with the mechanics of each application. For example, in order to program a particular application on the smartcard, a person must be familiar with the syntax of the programming language that is used to program that particular application. Consequently, the task of managing multiple applications on the smartcard becomes quite burdensome.

Hence, it would also be desirable to have a method and system that is capable of facilitating application management on a smartcard.

BRIEF SUMMARY OF THE INVENTION

A system for facilitating memory and application management on a secured token, such as a smartcard, is provided. According to one exemplary embodiment, the system includes a client having a number of applications and a smartcard having specification logic that allows file structure and security and access conditions to be defined, a common command (CC) applet and a passcode and access (P&A) applet. The CC applet (and its instances) supports two sets of commands, one set for each corresponding state. The P&A applet (and its instances) supports all the commands supported by the CC applet as well as a number of additional commands that are intended to provide additional services.

Each application has a corresponding group of data on the smartcard. Depending on security and access requirements, either the CC applet or the P&A applet is instantiated, i.e., an applet instance is created, to manage each group of application data. In other words, there is a corresponding applet instance for each group of application data. At the time of instantiation, the specification logic allows an application to specify the file structure and security and access conditions for its group of application data. Optionally, the security and access conditions can be subsequently changed to accommodate additional access to the group of application data. Furthermore, the application can also specify which commands from the sets of commands that are supported by either the CC applet or the P&A applet are to be associated with the instantiated applet instance. An application contacts the corresponding applet instance in order to access a specific group of application data.

In an exemplary manner, one client having one or more applications is able to communicate with multiple applet instances. Conversely, one applet instance is able to communicate with multiple clients.

The CC applet (and its instances) supports two sets of commands, one set for each corresponding state. The two states are selectable state and personalized state. Under the selectable state, the following commands are available including "select applet", "initialize update", "external authenticate", "store data", and "end personalization." Under the personalized state, the following commands are available including "select applet", "get data", "read binary", "read binary (secure messaging)", "read record", "read record (secure messaging)", "update binary", "update binary (secure messaging)", "update record", "update record (secure messaging)" and "verify passcode".

The P&A applet (and its instances) supports all the commands supported by the CC applet as well as a number of additional commands that are intended to provide additional services including, for example, passcode and credential management and cryptographic services. Under the selectable state, an additional command that is available to the P&A applet includes "get status". Under the personalized state, the additional commands that are available to the P&A applet include "get status", "internal authenticate", "change passcode" and "unblock passcode".

In an exemplary embodiment, some of the commands supported by the CC applet or the P&A applet are made available to applications that do not utilize the CC applet or the P&A applet to manage their respective data. For example, commands relating to passcode management and supported by the P&A applet can be made available to other applications residing on the smartcard. By making such commands available to these other applications, these other applications can take advantage of the already existing passcode management functionality without having to implement logic and/or commands to effect the same functionality on their own.

Reference to the remaining portions of the specification, including the drawings and claims, will realize other features and advantages of the present invention. Further features and advantages of the present invention, as well as the structure and operation of various embodiments of the present inven-

DETAILED DESCRIPTION OF THE INVENTION

Figure 1:
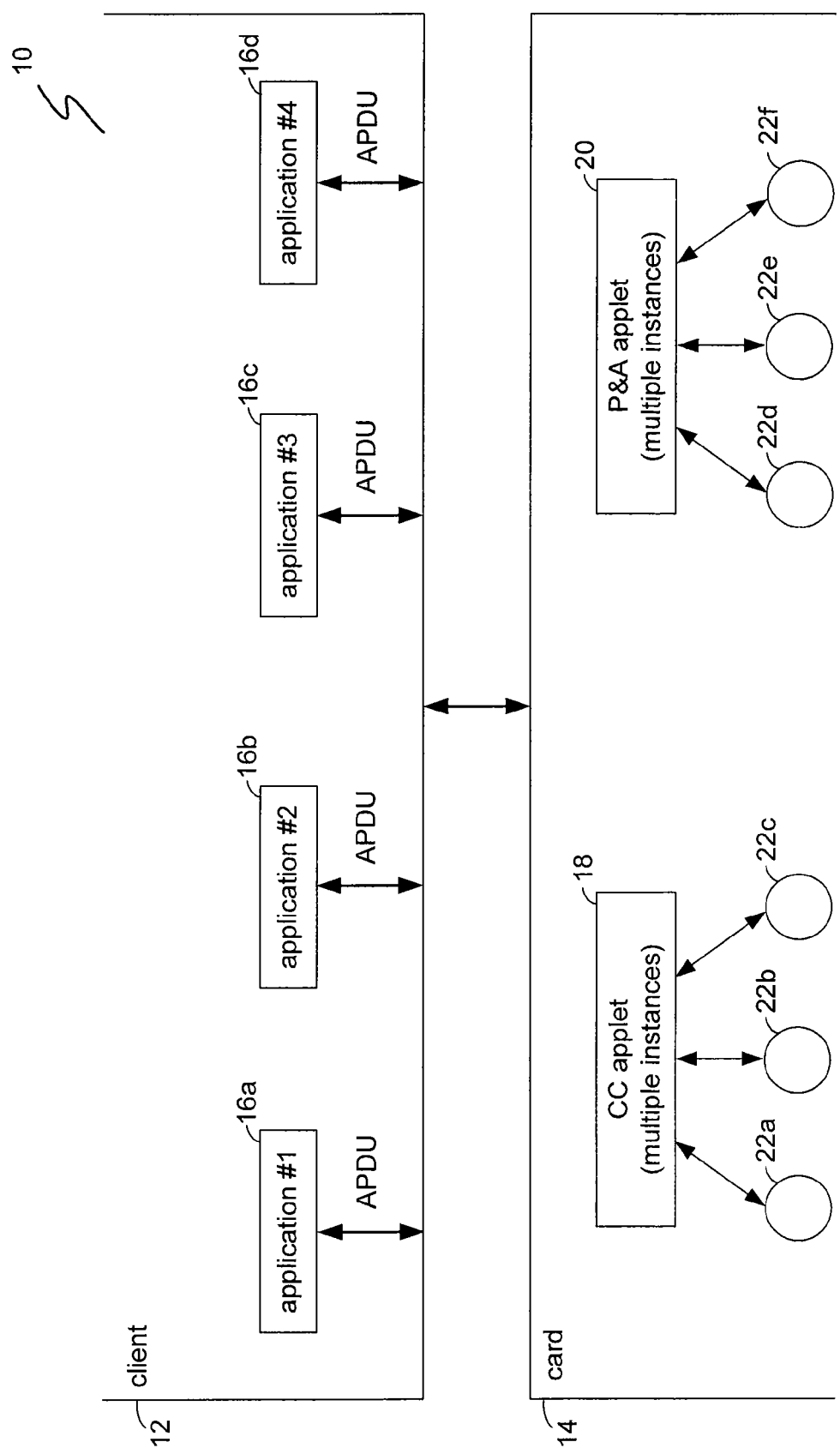
FIG. 1 is a simplified block diagram illustrating an exemplary embodiment of the present invention.

The present invention in the form of one or more exemplary embodiments will now be described. Referring to FIG. 1, in one exemplary embodiment, the system 10 includes a client 12 and a smartcard 14. The client 12 can be any kind of device and/or software that resides outside of the smartcard 14 and is capable of communicating with the smartcard 14. For example, the client 12 can be a personal computer, a kiosk, ATM software, etc. The client 12 further includes one or more applications or snap-ins 16a-d. These applications 16a-d can serve different purposes or functions. For example, an application 16a can be a business application designed to manage a loyalty program for smartcard holders. The applications 16a-d communicate with the smartcard 14 via use of Application Data Protocol Units (APDUs). APDUs are basic units of communications with a smartcard. In addition, it should be understood that while an exemplary embodiment includes a smartcard, the present invention in other alternative embodiments can be deployed with any secured token. A person of ordinary skill in the art will know of other ways and/or methods to deploy the present invention.

In an exemplary embodiment, the smartcard 14 includes specification logic that allows data or file structures and security and access conditions to be defined. The use of this specification logic will be further described below. The smartcard 14 also includes a common command (CC) applet 18 and a passcode and access (P&A) applet 20. As will be further described below, in one exemplary embodiment, the CC applet 18 supports two sets of commands, and the P&A applet 20 supports all the commands of the CC applet 18 as well as an additional set of commands designed to provide additional services including, for example, passcode management and credential management services. The added functionality provided by the P&A applet 20 may be appropriate for some applications. The CC applet 18 and the P&A applet 20 provide standardized commands that can be used by the applications 16a-d to access and manage data stored on the smartcard 14. In other words, different applications 16a-d can utilize the CC applet 18 and the P&A applet 20 and the respective commands that they provide to access and manage their respective data stored on the smartcard 14. By utilizing the CC applet 18 and the P&A applet 20, different applications 16a-d can then manage their respective data in a standardized manner without having to know the details and mechanics behind how data management is effectuated by the smartcard 14. It should be noted that the CC applet 18 and the P&A applet 20 provide commands that effect common functionality that are often utilized by the various applications 16a-d. Each application 16, however, can further include its own logic or commands on the smartcard 14. Such logic or commands are designed to provide specific or unique functionality that is utilized exclusively by that application to manage its corresponding data. For example, a loyalty management application is able to use the P&A applet 20 to store and access its loyalty data in a secured manner; when the data is to be processed according to some loyalty program criteria, the loyalty management application uses its own logic and/or commands to process the loyalty transaction.

The system 10 operates in the following exemplary manner. Before data can be stored on the smartcard 14, certain functions and/or conditions with respect to management of that data are to be specified. For example, the appropriate data or file structure and security and access conditions for accessing the data can be specified. In order to achieve the foregoing, an application 16a contacts the smartcard 14 which, in turn, causes the CC applet 18 to be instantiated. That is, an instance of the CC applet 18 is created. Alternatively, depending on the functionality desired, the P&A applet 20 can also be instantiated. The CC applet instance supports the two sets of commands as mentioned above. The CC applet instance uniquely corresponds to the data 22a relating to the application 16a and is used to effect a number of functions with respect to data 22a.

At the time of instantiation of the CC applet instance, the specification logic can be used by the application 16a to define the file structure and/or associated security and access conditions for its data. The particular details with respect to the file structure and/or associated security and access conditions to be specified may vary from application to application. For example, the application 16a may specify the file size for its data and assign varying levels of security for access to its data 22a. One application 16b may be allowed free access to data 22a, while other applications 16c-d may need to be authenticated before data access is allowed. Furthermore, applications 16c-d may need to be authenticated differently; for example, a more sophisticated authentication scheme for application 16c and a simple password for application 16d. As a result, different applications 16a-d may each customize their own file structure and associated security and access conditions for their respective data 22a-d.

Moreover, the specification logic allows the application 16a to modify its file structure and associated security and access conditions at any time after they are initially defined. For example, the application 16a may want to grant data access to a new application that was not in existence at the time when the initial security and access conditions were set.

In addition, at the time of instantiation, the application 16a is able to selectively decide which of the commands supported by the CC applet 18 are to be available to the instantiated CC applet instance. In other words, the application 16a can select which commands are to be associated with the CC applet instance. Similarly, commands that may be made available to each CC applet instance may vary from application to application. For example, all of the commands supported by the CC applet 18 can be made available to the CC applet instance for managing the application data; alternatively, only a subset of all the available commands are used. As a result, different combinations of commands are available to meet the respective needs or design of different applications 16a-d. In this manner, the applications 16a-d can each choose and utilize selected commands to be provided by the respective CC applet instances. In other words, one application 16a can choose one subset of commands to be used for managing its data, while another application 16b can choose a different subset of commands, depending on the circumstances.

In addition to allowing the application 16a to select the associated commands for its CC applet instance, the application 16a is further able to define the usage conditions associated with each selected command. For example, the application 16a can define varying authorization levels for different applications 16b-d with respect to a selected command. One application 16b may not need to be authenticated before the selected command is available for its use, while another application 16c may need to be authenticated with respect to the same selected command.

Subsequently, when the application 16a needs to manage its data on the smartcard 14, the corresponding CC applet instance (and the associated commands that have been made available) is used by the application 16a to effect the data management functions. For example, the CC applet instance can be directed by the application 16a to perform save, delete, read or write functions with respect to the application's own data. Furthermore, other applications 16b-d can also communicate with the CC applet instance corresponding to the data relating to the application 16a to access such data. As described above, such data access by these other applications 16b-d may vary and is often restricted based on which application is seeking access. In some situations, for example, even if access is permitted, these other applications 16b-d are only given the right to read but not alter the data relating to the application 16a.

Likewise, when other applications 16b-c need to store their respective data 22b-c, the specification logic can be used to define the respective file structures and security and access conditions. Multiple corresponding CC applet instances are also created and their respective associated commands are specified. Each CC applet instance is used to manage the data 22 created and stored by the corresponding application 16. In other words, there is a one-to-one correspondence between a CC applet instance and the data created and stored by an application 16. For example, data 22a-d are each managed by a corresponding CC applet instance. In this manner, the data 22a associated with the corresponding applications 16a-d are kept separate.

In an exemplary manner, one client having one or more applications is able to communicate with multiple applet instances. Conversely, one applet instance is able to communicate with multiple clients.

It should be understood that while the foregoing is described with respect to the CC applet 18, the same applies to the P&A applet 20 as well. In other words, if services provided by the P&A applet 20 is desired by an application 16, an instance of the P&A applet 20 is created. This P&A applet instance similarly corresponds to data relating to that particular application 16.

According to one exemplary embodiment, the CC applet 18 provides a number of services including, for example, access to application data, creation, access and modification of files and passcode verification. The CC applet 18 is used by an application 16a to create and support a file system accessible to the client 12 through a common set of APDUs. More specifically, an CC applet instance is created that cooperates with the application 16a to create and support the desired file system. The file system managed by the CC applet instance is independent from potential other file systems. The files that can be managed by the CC applet instance include, for example, binary (transparent) files, fixed record (linear) files and cyclic record files. When files in the file system are first created, the files are defined with their respective security and access conditions to provide access protection. Access protection can be provided in a number of ways including, PIN verification and secure messaging. Under PIN verification, a smartcard holder is required to verify his/her PIN before accessing a file. Under secure messaging, a party is required to provide signed commands in order to access certain specific files.

As mentioned above, the CC applet 18 (and its instances) supports two different sets of commands. Which set of commands is available depending on the state of the CC applet instance. The CC applet instance can be in one of two states, namely, the "selectable" state and the "personalized" state. Under the selectable state, the following commands are available including "select applet", "initialize update", "external authenticate", "store data", and "end personalization." Under the personalized state, the following commands are available including "select applet", "get data", "read binary", "read binary (secure messaging)", "read record", "read record (secure messaging)", "update binary", "update binary (secure messaging)", "update record", "update record (secure messaging)" and "verify passcode". As mentioned above, an application 16 can selectively decide which of these commands are to be associated with an CC applet instance. For example, if tighter security is desired, an application 16 may specify only commands having secure messaging functionality to be associated with the CC applet instance for managing its data. Secure messaging is used to protect communications between the smartcard 14 and the client 12 in a hostile environment in which the communications can be compromised. For example, the client 12 and the smartcard 14 may need to communicate via a computer network or other form of transmission medium.

The "select applet" command that is available under the selectable state allows an application 16 to select a previously created CC applet instance. In the selectable state, the "select applet" command when invoked does not return any response data. Once the "select applet" command is selected, the other commands supported by the CC applet instance become available.

The "initialize update" command initiates a secure channel to be used by subsequent commands. This command allows card authentication by the client 12 and computes session keys used for MAC computation of subsequent commands.

The "external authenticate" command is used to authenticate an external device to the smartcard 14. It is part of the APDU command sequence that is used to initiate a secure channel. This command is preceded by the "initialize update" command mentioned above.

The "store data" command is used to store information in the CC applet instance during personalization phase. During the personalization phase, a party such as an issuer of the smartcard 14 personalizes the smartcard 14 with its own specific information thereby allowing the smartcard 14 to be subsequently identified as relating to that party.

The "end personalization" command is used the end of the personalization phase, i.e., when all the information that is to be stored have been sent through the "store data" commands. In addition, this command computes a Key Check Value and compares its with in the APDU. When this command is executed, the CC applet transitions to a personalized state.

The "select applet" command that is available under the personalized state allows an application 16 to select a previously created CC applet instance. In effect, this allows an application 16 to use the selected CC applet instance to manage the corresponding data. Similarly, when the "select applet" command is selected, the other commands supported by the CC applet instance become available. Unlike the "select applet" command available under the selectable state, the "select applet" command when invoked in the personalized state provides a response message.

The "get data" command is used to access different types of information from a CC applet instance. The different types of information include, for example, the number of remaining passcode tries (before it is blocked), thee transaction number indicating the number of times the CC applet instance has been selected after card reset and the status of the global PIN (validate or not validated).

The "read binary" command is used to read information from a transparent file designated by its short file identifier. Data to be read are designated by their offset in the file in data unit size. The data unit size of a file is defined at file creation during the CC applet instantiation. The "read binary (secure messaging)" command is used when secure messaging is desired. The "read binary (secure messaging)" command includes a data field having a n-byte long MAC to allow secure messaging to be established. The MAC is used to authenticate that the command came from an issuer of the smartcard 14 or a source authorized by the issuer to create the command.

The "read record" command is used to read records from a liner or a cyclic file designated by its short file identified. Records can be read partially or as a whole. The "read record (secure messaging)" command is used when secure messaging is desired. The "read record (secure messaging)" command includes a data field having a n-byte long MAC to allow secure messaging to be established.

The "update binary" command is used to modify information in a transparent file designated by its short file identifier. Data to be modified or updated are designated by their offset in the file in data unit number. The data unit size of a file is defined at file creation during the CC applet instantiation. The "update binary (secure messaging)" command is used when secure messaging is desired. The "update binary (secure messaging)" command includes a data field having a n-byte long MAC to allow secure messaging to be established.

The "update record" command is used to modify records in a linear or a cyclic file designated by its short file identifier. Records can be modified or updated partially or as a whole. When modifying a fixed linear record file, any record can be modified as records are accessed by their index in the file (record number). When modifying a cyclic file, only the "oldest" record can be modified. Once a record in the cyclic file is modified, it becomes the first or "newest" record. The "update record (secure messaging)" command is used when secure messaging is desired. The "update record (secure messaging)" command includes a data field having a n-byte long MAC to allow secure messaging to be established.

The "verify" command is used to verify the passcode provided by the smartcard holder. The passcode is converted to a card global PIN. The CC applet uses the card global PIN to open corresponding access conditions for the data 22 managed by corresponding CC applet instance. The passcode is a smartcard holder secret that is shared by all CC applet instances. Hence, by providing the passcode, the smartcard holder is granted access to all CC applet instances on the smartcard 14.

As mentioned above, the P&A applet supports all the commands of the CC applet 18 as well as an extra set of commands providing additional services including, for example, passcode management and credential management services. These additional services, such as, passcode and credential management and cryptographic services, utilize authentication mechanisms including symmetric keys and/or public keys to provide secure access to the data 22d-f. For example, the P&A applet 20 can provide the following cryptographic services including, DES MAC and RSA signature.

The P&A applet 20 provide the passcode verification mechanism as described above. Further, the P&A applet 20 provides the mechanisms for changing and unblocking the card global PIN. In order to change the card global PIN, the current passcode is sent with the new passcode. The P&A applet 20 first verifies the current passcode. If the verification is successful, the P&A applet 20 converts the new passcode value to an EMV format and changes with current passcode with the new EMV value. The current passcode remains in a validated state.

When the passcode is blocked, the P&A applet 20 has the capability to unblock it for a limited number of times. More specifically, the P&A applet 20 internally manages an "unblocking counter" that is decremented each time the smartcard holder tries to unblock the passcode (whether the unblocking is successful or not). In order to successfully unblock a passcode, a new passcode value is provided by the smartcard holder as well as another special passcode called an "unblocking passcode". The P&A applet 20 has access to several unblocking passcodes that are stored internally on the smartcard 14. Each unblocking passcode is designed to be used only once. If the unblocking passcode supplied by the smartcard holder is valid, then the passcode is unblocked and reset to the new value, and the unblocking passcode provided by the smartcard holder is invalidated. If the unblocking passcode provided by the smartcard holder is invalid, the passcode remains blocked. When the unblocking counter reaches zero, then the passcode can no longer be unblocked (even if there are valid unblocking passcodes remaining).

Likewise, the P&A applet 20 (and its instances) also supports two different sets of commands. Which set of commands is available depending on the state of the P&A applet instance. The P&A applet instance also can be in one of two states, namely, the "selectable" state and the "personalized" state. Under the selectable state, the following commands are available to the P&A applet 20 including "select applet", "get status", "initialize update", "external authenticate", "store data", and "end personalization." Under the personalized state, the following commands are available to the P&A applet 20 including "select applet", "get data", "read binary", "read binary (secure messaging)", "read record", "read record (secure messaging)", "update binary", "update binary (secure messaging)", "update record", "update record (secure messaging)", "verify passcode", "get status", "internal authenticate", "change passcode" and "unblock passcode".

The "select applet", "initialize update", "external authenticate", "store data" and "end personalization" commands available in the selectable state provide the same respective functions as those comparable commands which are available to the CC applet 18, as described above.

The "get status" command is used to return information detailing the internal status of the P&A applet 20.

The "store data" command is used to store information in the P&A applet 20 during the personalization phase.

The "end personalization" command is used at the end of the personalization phase, i.e., when all the information that has to be stored have been sent through the "store data" commands. Certain authentication mechanisms such as, DES keys and RSA private key, are used by this command to provide added data security. When this command is executed, the P&A applet transitions to a personalized state.

The "select applet", "get status" commands that are available to the P&A applet 20 during the personalized state provide the same respective functions as those comparable commands which are available to the P&A applet 20 during the selectable state, as described above.

The "internal authenticate" command is used to calculate a DES MAC of incoming data and/or generate an RSA signature of the incoming data. The passcode is verified before this command is executed.

The "change passcode" command is used to modify the value of the current passcode. In order to modify the value of the current passcode, the command contains the value of the current passcode as well as the new value. The passcode is verified before this command is executed. That is, the P&A applet 20 first validates the current passcode value before changing it to the new value. If the validation fails, the passcode try counter is decremented (possibly blocking the passcode), and the card global PIN status is reset to "not validated."

The "unblock passcode" command is used to unblock the passcode. In order to unblock the passcode, the command contains a valid unblocking passcode and a new passcode value. The unblocking passcode is received from the smartcard holder and checked against a number of corresponding unblocking passcodes that have been previously stored on the smartcard 14. If the unblocking passcode provided by the smartcard holder is valid, then the passcode is reset with the new value and the corresponding unblocking passcode stored in the smartcard holder is invalidated. As mentioned above, the unblocking passcodes are defined during the personalization phase.

In an alternative exemplary embodiment, selective commands of the CC applet 18 or the P&A applet 20 are made available to applications that do not utilize the CC applet 18 and the P&A applet 20 to manage their data. That is, an application that does not utilize the CC applet 18 and the P&A applet 20 to manage its data is able to inherit or use some of the functionality offered by selective commands of the CC applet 18 or the P&A applet 20. For example, commands relating to passcode management and supported by the P&A applet 20 can be made available to other applications residing on the smartcard 14. By making such commands available to these other applications, these other applications can take advantage of the already existing passcode management functionality on the smartcard 14 without having to implement logic and/or commands to effect the same functionality on their own. This centralized passcode management approach, i.e., allowing all applications on the smartcard 14 access to the passcode functionality, regardless of whether an application utilizes other commands supported by the CC applet 18 or the P&A applet 20, allows one passcode to be used to access the smartcard 14. This provides convenience of use to the smartcard holder because the smartcard holder only has to remember and provide one single passcode to gain access to all the applications on the smartcard 14, even though an application may have its own proprietary control logic in the smartcard 14 to manage its data.

The foregoing description with respect to the CC applet 18 and the P&A applet 20 and their respective sets of commands is provided for illustrative purposes only. Based on the disclosure and teachings provided herein, it will be appreciated by a person of ordinary skill in the art that the present invention can be implemented in various different manners. For example, the present invention is not limited to the two types of applets, i.e., CC applet 18 and P&A applet 20, as described above; other types of applets can be implemented and one or more types of applets may be available on a smartcard. Furthermore, the nature and number of commands supported by each applet can also vary depending on the specific design and/or constraints of particular applications to be installed on a smartcard. For example, if a smartcard is to contain a number of related loyalty applications, some of the logic and/or commands used to effect specific loyalty transaction functionality that are present in each of the related loyalty applications can be implemented as a set of commands supported by a loyalty applet, as described above. The related loyalty applications can then each invoke the loyalty applet, when appropriate, to effect such functionality.

Based on the disclosure and teachings provided herein, it will be appreciated by a person of ordinary skill in the art that the present invention provides a number of benefits and advantages. For example, the present invention provides additional flexibility with respect to data management on smartcard. Applications are able to customize their own respective file structures and security and access conditions and specify their desired commands from a set of common commands for managing their respective data. Moreover, the customization and specification of commands can be performed after the smartcard is issued. For example, a blank smartcard can be issued to a smartcard holder. An application using the present invention can subsequently customize its own data structure and specify the security and access conditions and the associated commands for managing data to be stored on the smartcard. In another example, the initially specified security and access conditions can be subsequently changed to accommodate new circumstances, such as, a new application needing access to the data.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system comprising:
a client including a first application; and
a secured token including an applet providing a set of common commands including a first plurality of commands allowing specification of different file structures for separate instances of the applet and a second plurality of commands providing passcode and credential management for instances of the applet,
wherein the applet is operable to be instantiated to create a first applet instance for the first application utilizing the second plurality of commands to allow a holder of the secured token to access data in the secured token for the first application using a passcode regardless of whether the first applet instance utilizes the first plurality of commands to specify a file structure for the first applet instance, the passcode being a single passcode for the secured token operable to provide access to data in the secured token relating to any instance of the applet.

2. The system of claim 1 wherein the secured token is a smartcard.

3. The system of claim 1 wherein the client includes a plurality of applications, the set of common commands providing functionality that is commonly utilized by the plurality of applications.

4. The system of claim 1 wherein the applet is further operable to instantiate a second applet instance for a second application, the first plurality of commands further allowing a second file structure to be specified for the second application that is different from a first file structure used to store application data for the first application in the secured token.

5. The system of claim 1 wherein the first application includes control logic for managing data and does not utilize the first plurality of commands.

6. The system of claim 1 wherein the first plurality of commands includes a first set of commands that is available when a corresponding applet is in a first state and a second set of commands that is available when the corresponding applet is in a second state.

7. The system of claim 6 wherein the first set of commands includes a select command for selecting a desired applet instance, an initialize command for establishing a secure channel between the client and the secured token, an authenticate command for authenticating the client to the secured token, a store command for storing information when the secured token is in a personalization phase, and an end-personalization command designed to transition the corresponding applet to the second state.

8. The system of claim 7 wherein communications with the secured token are protected by secure messaging.

9. The system of claim 1 wherein the set of common commands includes a select command for selecting a desired applet instance, a retrieve command for retrieving information from a desired applet instance, a file read command for reading data from a desired file, a record read command for reading data from a desired record in a file, a file update command for updating data in a desired file, a record update command for updating a desired record, and a verify passcode command for verifying the passcode in order to access the secured token.

10. The system of claim 1 wherein the set of common commands includes a get status command for retrieving information detailing an internal status of the corresponding applet, and wherein the second set of commands includes a get status command for retrieving information detailing an internal status of the corresponding applet, an internal authenticate command for providing credential management services for incoming data, a change passcode command for modifying the passcode used for accessing the secured token, and an unblock passcode command for unblocking the passcode.

11. The system of claim 1 wherein the second plurality of commands includes at least one cryptographic service utilizing a signature selected from the group consisting of DES-MAC and RSA signatures.

12. The system of claim 1, wherein the second plurality of commands provides passcode management and credential management utilizing an authentication mechanism including at least one of a symmetric key and a public key for secure access.

13. A method comprising:
providing an applet on a secured token, the applet providing a set of common commands including a first plurality of commands allowing specification of different file structures for separate instances of the applet and a second plurality of commands providing passcode and credential management for the separate instances of the applet; and
instantiating a first applet instance for a first application utilizing the second plurality of commands to allow a holder of the secured token to access data in the secured token for the first application using a passcode regardless of whether the first applet instance utilizes the first plurality of commands to specify a file structure for the first applet instance, the passcode being a single passcode for the secured token operable to provide access to data in the secured token relating to any instance of the applet.

14. The method of claim 13 further comprising:
providing the secured token, wherein the secured token is a smartcard.

15. The method of claim 13 further comprising:
using the first application in a client to interact with the first applet instance.

16. The method of claim 13 further comprising:
protecting communications with the secured token by secure messaging.

17. The method of claim 13 further comprising:
utilizing at least one cryptographic service provided by the second plurality of commands and utilizing a signature selected from the group consisting of DES-MAC and RSA signatures.

18. The method of claim 13 further comprising:
utilizing an authentication mechanism of the second plurality of commands for passcode and credential management including at least one of a symmetric key and a public key for secure access.

19. The method of claim 13 further comprising using the secured token for financial transactions.

20. A computer program product embedded in a computer readable medium for managing data on a secured token, comprising:
program code for providing a set of common commands in an applet including a first plurality of commands allowing specification of different file structures for separate instances of the applet and a second plurality of commands providing passcode and credential management for instances of the applet; and
program code for instantiating a first applet instance for a first application utilizing the second plurality of commands to allow a holder of the secured token to access data in the secured token for the first application using a passcode regardless of whether the first applet instance utilizes the first plurality of commands to specify a file structure for the first applet instance, the passcode being a single passcode for the secured token operable to provide access to data in the secured token relating to any instance of the applet.

21. The computer program product of claim 20, further comprising:
program code for protecting communications with the secured token by secure messaging.

22. The computer program product of claim 20, further comprising:
program code for providing at least one cryptographic service utilizing a signature selected from the group consisting of DES-MAC and RSA signatures.

23. The computer program product of claim 20, further comprising:
program code for utilizing an authentication mechanism for passcode and credential management including at least one of a symmetric key and a public key for secure access.

* * * * *